United States Patent [19]

Wright

[11] 4,338,711
[45] Jul. 13, 1982

[54] BRAKE ADJUSTER TOOL

[76] Inventor: John T. Wright, Box 254, Greensboro, Md. 21639

[21] Appl. No.: 195,694

[22] Filed: Oct. 9, 1980

[51] Int. Cl.³ .............................................. B23P 19/04
[52] U.S. Cl. ........................................ 29/251; 29/227; 29/252; 29/263; 254/10.5
[58] Field of Search .................. 29/251, 252, 263, 227, 29/215; 254/10.5

[56]   References Cited
U.S. PATENT DOCUMENTS

| 1,469,076 | 9/1923 | Faber | 254/10.5 |
| 2,948,057 | 8/1960 | Dagenais | 29/251 |
| 3,546,767 | 12/1970 | McFarland | 29/227 |
| 3,814,382 | 6/1974 | Castoe | 254/10.5 |
| 3,858,463 | 1/1975 | Klavonich | . |
| 4,036,473 | 7/1977 | Kloster | 29/227 |

FOREIGN PATENT DOCUMENTS

| 283263 | 1/1928 | United Kingdom | 29/215 |
| 607491 | 8/1948 | United Kingdom | 29/215 |

*Primary Examiner*—Robert C. Watson
*Attorney, Agent, or Firm*—Donald J. Singer; Arsen Tashjian

[57]   ABSTRACT

A brake adjuster tool including a set of dies and a pneumatic press for assembly and disassembly of a main landing gear brake adjuster. The assembly operation requires only two steps saving considerable time while presetting the adjuster pin automatically on assembly. The brake adjuster tool includes a pneumatic cylinder or diaphragm, control valve and air regulator and provides a mechanical pressure of up to 400 pounds with a linear travel of 4 inches which is needed to perform the operation.

1 Claim, 5 Drawing Figures

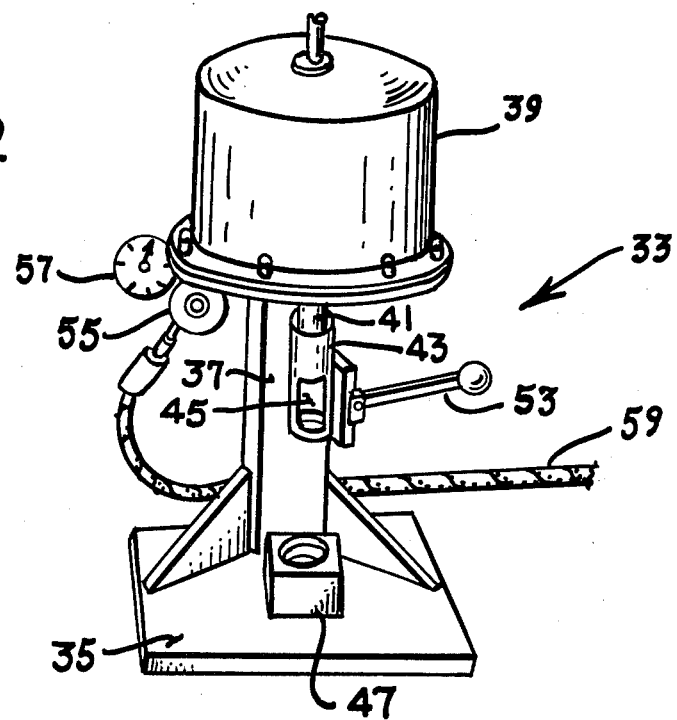
FIG. 2
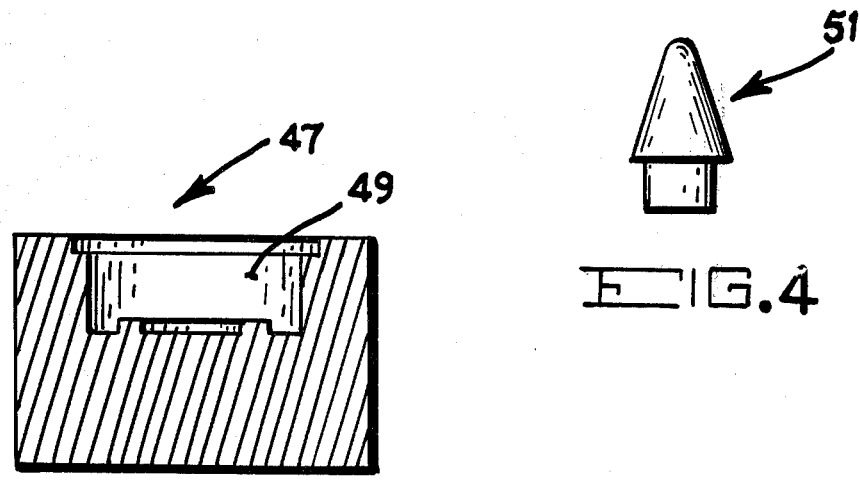
FIG. 3
FIG. 4

BRAKE ADJUSTER TOOL

STATEMENT OF GOVERNMENT INTEREST

The invention described herein may be manufactured and used by or for the Government for governmental purposes without the payment of any royalty thereon.

BACKGROUND OF THE INVENTION

This invention relates to a brake adjuster tool and, more particularly, the invention is concerned with providing a pneumatic press for assembly and disassembly of a main landing gear brake adjuster.

Heretofore, in order to assemble and/or disassemble the brake adjusters on the main landing gear of an aircraft which uses multiple disk brakes, a drill press having a half inch capacity chuck is utilized. A pressure pin held tightly in the chuck is lowered though a jig which applies pressure to compress the main spring of the brake adjuster. When the spring is compressed the friction lock on the drill press is applied to hold the drill in position while the retainer ring is installed. Because of the unreliability of the friction lock on the drill press, this method of assembling (disassembling) the brake adjuster is dangerous since the inadvertant release of the drill press friction lock will allow the press handle to spin rapidly. If body contact should accidentally be made with the handle while it is spinning, a serious injury could result. Also, the above described method of using a drill press requires three separate steps during assembly and two steps for disassembly. Thus it can be seen that a potential safety hazard as well as inefficient work methods exist in the operation as now being performed.

SUMMARY OF THE INVENTION

The present invention is concerned with providing a simpler and safer tool for assembling and/or disassembling the brake adjuster on a main landing gear brake. The brake adjuster tool includes a pneumatic cylinder with a control valve and an air regulator and a set of dies. The pneumatic tool requires only two steps for assembly and one step for disassembly thus saving considerable time over previously known methods.

Accordingly, it is an object of the invention to provide a brake adjuster tool which is simpler to operate and safer by preventing possible injury to the operator who is performing the task.

Another object of the invention is to provide a tool for assembling and/or disassembling the brake adjusters on the main landing gear of an aircraft wherein only two steps are required for assembly and only one step for disassembly.

Still another object of the invention is to provide a brake adjuster tool wherein the work methods are improved to such an extent that many man hours are saved and improper assembly is prevented.

A further object of the invention is to provide a brake adjuster assembly tool wherein the adjuster pin is preset automatically during assembly in accordance with the recommended technical procedure.

A still further object of the invention is to provide a brake adjuster rebuilding tool which is capable of producing a pressure of 400 pounds and a linear travel of 4 inches.

These and other objects, features and advantages will become more apparent after considering the following description taken in conjunction with the annexed drawings and appended claims.

BRIEF DESCRIPTION OF THE DRAWINGS

FIG. 2 is a general view in perspective of a pneumatic press according to the invention for assembly and disassembly of the brake adjuster;

FIG. 3 is a view in cross section of the housing die for holding the brake adjuster in position in the pneumatic press;

FIG. 4 is a general view of the guide bullet for use during the assembly of the brake adjuster.

DESCRIPTION OF A PREFERRED EMBODIMENT

Figure 1:
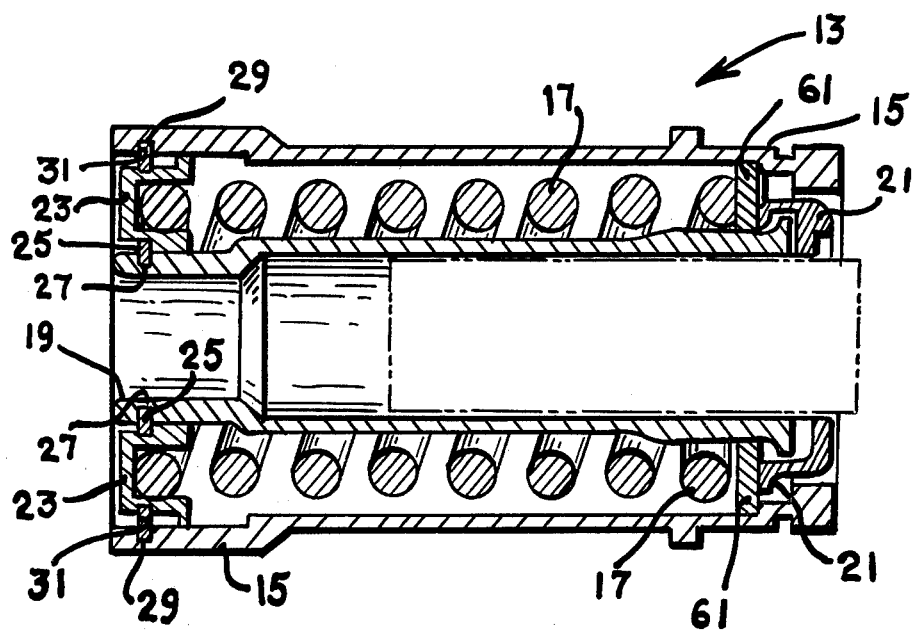
FIG. 1 is a view in cross section of an assembled brake adjuster for use on multiple disk brakes which are used on the main landing gear of large military and civilian aircraft.

Referring now to the drawings in which like reference numerals refer to like elements in the several views. In FIG. 1 there is shown a brake adjuster assembly 13 which is used on the main landing gear multiple disk brakes on large military and commercial aircraft. The brake adjuster 13 includes a housing 15 which surrounds a coil spring 17 that is under load when the brake adjuster 13 is in assembled condition. The spring 17 is positioned around a sleeve 19 in which a piston (not shown) is urged inward against the side of the aircraft brake when the adjuster is in operation.

A first retainer 21 is positioned at the inner end of the spring 17 between the housing 15 and the sleeve 19. A second retainer 23 is positioned at the outer end of the spring 17 between the sleeve 19 and the housing 15. The retainers 21 and 23 serve to hold the spring 17 in the compressed state when the adjuster 13 is in the assembled condition. A first retaining ring 25 is positioned in a groove 27 near the outer end of the sleeve 19 and rests against a shoulder on the outer retainer 23 serving to hold the spring 17 and the sleeve 19 assembled. A second retaining ring 29 is positioned in the groove 31 near the outer end of the housing 15 and serves to maintain the housing 15 in place around the coil spring 17. The brake adjuster 13 is shown in FIG. 1 in the fully assembled condition.

Figure 5:
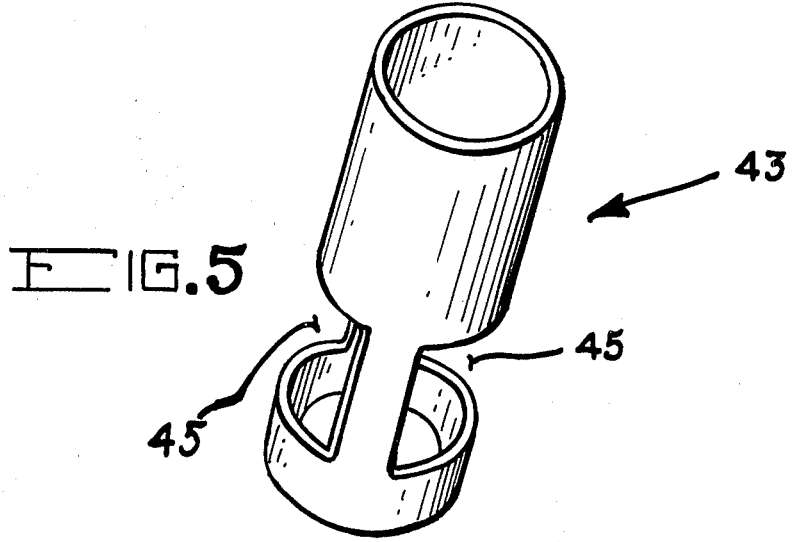
FIG. 5 is an enlarged view in perspective of the compression die tube which is attached to the pneumatic press for applying pressure to the brake adjuster during assembly and disassembly thereof.

In FIG. 2, there is shown a pneumatic press 33 especially designed for assembling and disassembling the brake adjuster shown in FIG. 1. The pneumatic press 33 includes a base portion 35 and an upright portion 37 extending vertically upward therefrom. A pneumatic cylinder 39 is attached to the upper end of the upright portion 37 and includes a piston 41 which extends downwardly over the center of the base 35. A compression die tube 43 is fixedly attached to the lower end of the piston 41 and moves upwardly and downwardly therewith during the assembly and disassembly of the brake adjuster 13. The compression die tube 43 which is shown more clearly in FIG. 5, includes cut away window portions 45 through which the retaining rings 25 and 29 are installed in their respective positions on the brake adjuster assembly 13.

A housing die 47 is positioned directly under the compression die tube 43 on the base 35 of the pneumatic press 33 in vertical alignment therewith. The housing die 47 is provided with a machined opening 49 with various shoulders and grooves which match the retainer 21 and the inner end of the housing 15 so that the housing die 47 serves to hold the inner (lower) end of the brake adjuster 13 in position during the assembling and disassembling operations. A guide bullet 51 shown in FIG. 4 fits into the outer (upper) end of the sleeve 19 and serves to guide the compression guide tube 43 down over the sleeve 19 during the operation of the pneumatic press 13 to compress the spring 17.

The pneumatic press 33 also includes a control lever 53 which controls the operation of a three-way, three position pneumatic control valve. The pneumatic cylinder 39 is preferably a single acting, spring return actuator with a three to four inch stroke and capable of developing a 400 to 500 pound force. The control lever 53 operates the three-way valve to provide pressure in, pressure out and atmosphere vent for the pneumatic cylinder 39. An air pressure regulator 55 with a pressure gauge 57 operates to regulate the pressure from the line 59 to the pneumatic cylinder 39. The inlet pressure to the regulator is 90-120 psi and the regulated outlet is 0-100 psi. The outlet pressure in conjunction with the area of the piston 41 should be capable of developing a 400 to 500 pound force.

In operation, the brake adjuster 13 shown in FIG. 1 is assembled in two steps. In the first step, the spring 17 is installed on the sleeve 19. This is accomplished by placing the first retainer 21 in the opening 49 in the housing die 47. The lower end of the sleeve 19 is placed in the first retainer 21 and a washer 61 is placed over the retainer 21. The coil spring 17 is then placed over and around the sleeve 19 and the second retainer 23 is positioned over the upper (outer) end of the coil spring 17. The pneumatic press 33 is then actuated causing the compression die tube 43 to force the coil spring 17 with the retainer 23 downward around the sleeve 19 exposing the groove 27 therein. This permits the first retaining ring 25 to be installed in the groove 27 through the windows 45 in the compression die tube 43. When the pneumatic press 33 is released, the coil spring 17 forces the second (outer) retainer 23 upward against the first retaining ring 25 so that the spring 17 is now installed on the sleeve 19.

In the second step of the assembly procedure, the housing 15 is placed around the partially assembled brake adjuster 13 with the lower end thereof in the housing die 47. The coil spring 17 is again compressed in the manner outlined in the first step until the groove 31 in the housing 15 is exposed. The second retaining ring 29 is installed in the groove 31 in the housing 15 and the pneumatic press 33 is released allowing the coil spring 17 to move upward. With the retaining rings 25 and 28 in their respective grooves 27 and 31, the brake adjuster 13 is assembled and ready for installation on the aircraft.

The brake adjuster 13 is disassembled in one step by placing it vertically in the housing die 47 and bringing the compression die tube 43 down against the second (outer) retainer 23 causing the coil spring 17 to compress when the pressure is applied by the pneumatic press 33. This exposes both retaining rings 25 and 29 which can be removed through the windows 45 in the compression die tube 43. Release of the pressure of the pneumatic press 33 allows the coil spring 17 to be free to expand and the brake adjuster 13 can be completely disassembled without any further need for tools and/or pressure sources.

From the foregoing description of my invention, it can be seen that the brake adjuster tool saves many man hours as well as improving the work methods and safety during the job of assembly and disassembly of the brake adjusters. As much as thirty minutes per brake can be saved by using the hereinbefore described brake adjuster tool in place of the presently used drill press, pressure pin and jig.

Although the invention has been illustrated in the accompanying drawings and described in the foregoing specification in terms of a preferred embodiment thereof, the invention is not limited to this embodiment. It will be apparent to those skilled in the art that the hereinbefore described brake adjuster tool can be used in the assembly and disassembly of other devices similar in nature and that various changes, modifications and substitutions can be made therein, particularly with regard to the construction details without departing from the true spirit and scope of the appended claims.

Having thus set forth the nature of my invention, what I claim and desire to secure by Letters Patent of the United States is:

1. A brake adjuster device for assembling and disassembling a brake adjuster on the landing gears of large aircraft, said brake adjuster device comprising:

means for supporting said brake adjuster, said support means including a base portion with an upright portion extending vertically upward therefrom;

means for guiding said brake adjuster, said guiding means including a housing die affixed to said base portion, said housing die having a machined opening in the upper surface thereof and a plurality of shoulders and grooves corresponding to the configuration of one end surface of said brake adjuster, a cylindrical compression die tube that inserts into the other end of said brake adjuster, said compression die tube having window portions cut away from the wall thereof to allow installation and removal of retaining rings on said brake adjuster, and a guide bullet inserted into the end of said brake adjuster that receives said compression die tube, said guide bullet guides said compression die tube during insertion into said brake adjuster; and means for providing pressure, said pressure providing means including an air pressure regulator for receiving pressurized air, a pressure gauge for measuring air pressure from said air pressure regulator, a pneumatic cylinder for receiving said regulated air pressure attached to the upper end of said upright portion, said cylinder having a pneumatic piston therein for vertical movement in response to pressure in said pneumatic cylinder, said compression die tube attached to said piston and centered over said housing die, and means for pressurizing said pneumatic cylinder, said pressurizing means including a three-way pneumatic control valve and actuating lever for controlling the operation of said three-way pneumatic control valve connected to said pneumatic cylinder, said control valve upon actuation biases said piston having said compression die tube attached thereon vertically downward thereby applying pressure to said brake adjuster so that retaining rings therein can be released and removed during disassembly and installed during assembly.

* * * * *